July 24, 1934.  B. WENGARD  1,967,522
TIRE COVER
Filed July 31, 1933   2 Sheets-Sheet 1
Fig. 1.
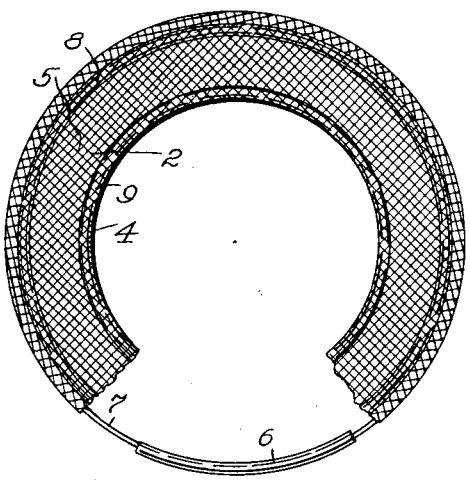
Fig. 2.
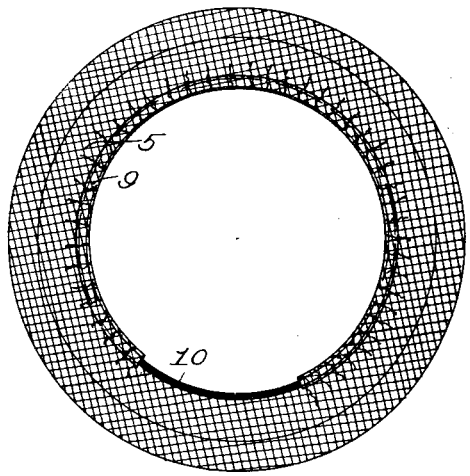
Fig. 4.
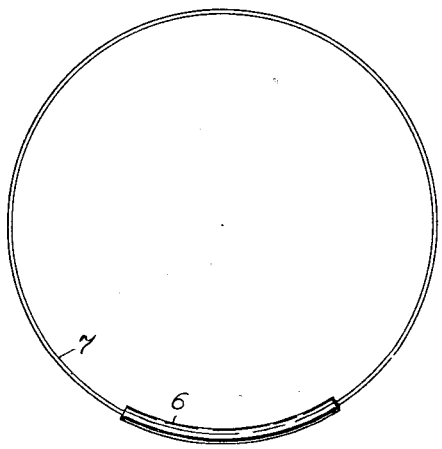
Fig. 9.
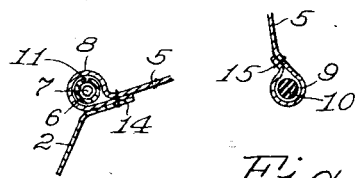
Fig. 10.
Fig. 11.
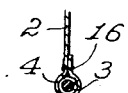
Inventor
Ben Wengard.
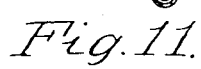
By
Attorney July 24, 1934.　　B. WENGARD　　1,967,522
TIRE COVER
Filed July 31, 1933　　2 Sheets-Sheet 2
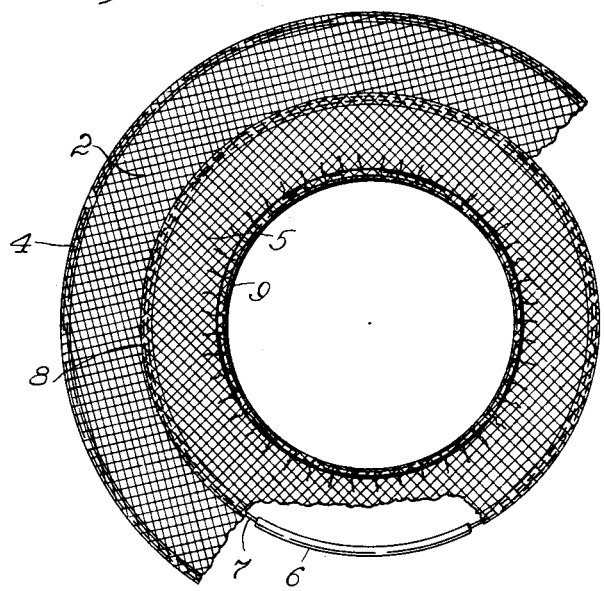
Fig. 3.
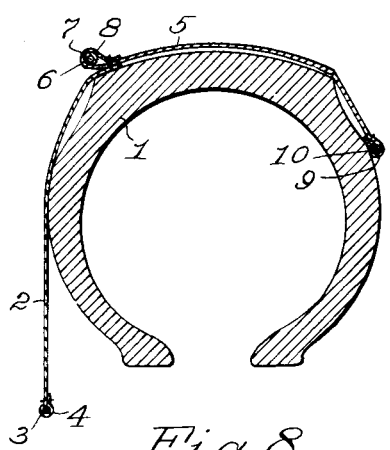
Fig. 8.
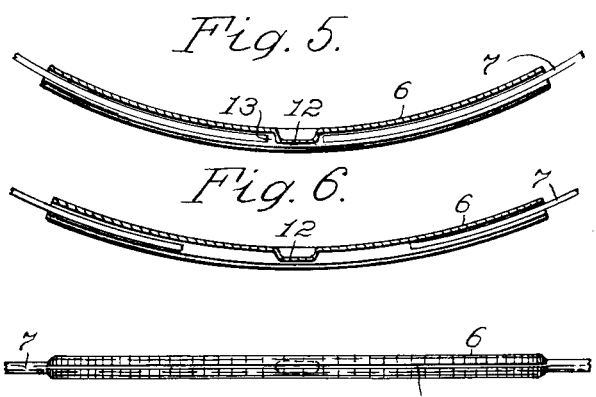
Fig. 5.
Fig. 6.
Fig. 7.
Inventor
Ben Wengard,
By G. C. Kennedy
Attorney Patented July 24, 1934

1,967,522

UNITED STATES PATENT OFFICE 1,967,522

TIRE COVER

Ben Wengard, Waterloo, Iowa

Application July 31, 1933, Serial No. 682,916

2 Claims. (Cl. 150—54)

My invention relates to improvements in tire covers, and the object of my improvement is to supply for a pneumatic tire casing of a motor car, a cover which is distensible in a desired extent and thus rendered capable of being fitted upon tires of slightly different diameters.

Another object of my improvements is to combine with such a cover a resilient expansion split ring housed therein and functioning under some compression to keep the cover extended to fit the tire circumferentially in a limited amount of distension of the cover.

Another object of my improvements is to combine with such a resilient split-ring a covering tube for the separated ends thereof and within which such ends may vary in their separation according to the differential expansions of the ring, while retaining the general circularity of the ring in conjunction with the curvate shape of the tube.

Another object of my improvements is to provide a fixed stop within said curvate tube positioned within the separated ends of said ring to prevent possible rotation of the ring to have an end escape from the tube.

Another object of my improvements is to make such a cover from connected pieces of textile material, of which one or both are cut on a bias relative to warp and woof and with a relative arrangement of their biased parts, whereby an even distension or stretching of the cover may be obtained to permit it to be adjustably fitted upon tires of slightly varying diameters.

These objects I have accomplished in actual reduction to practice by the means which are hereinafter described and claimed, and which are illustrated in the accompanying drawings, it being kept in mind that various minor changes may be effected in all or any of the elements of my invention, without thereby deviating from the protection of the appended claims.

In said drawings, Fig. 1 is an elevation of one side of my tire cover with a portion broken away to disclose the split-ring gap-closing arcuate tube, and Fig. 2 is an elevation of the opposite side of said cover. Fig. 3 is a diagrammatic plan view of the tire cover having a portion broken away, and then having its connected elements spread out flatly in a plane. Fig. 4 is a detail view of the split-ring with its separated ends housed in an arcuate tube. Figs. 5 and 6 are longitudinal sections of the arcuate tube with its inpressed stop, and showing end parts of the split-ring housed in the tube in different degrees of separation from each other at opposite ends of the stop. Fig. 7 is an elevation of the outer circumferential face of said tube, showing a circumferential split or joint therein. Fig. 8 is an enlarged cross section of the casing of an automobile tire with my improved cover device mounted thereon, in cross section. Fig. 9 is an enlarged cross section of the rim housing of the cover for the arcuate tube and split-ring. Fig. 10 is an enlarged cross section of a similar rim housing of the cover for the elastic ring for clamping the cover on the tire. Fig. 11 is a similar rim housing for the cover side wall interiorly to receive the usual paper seaming cord of the wall and stiffen it in shape.

In Figs. 1 to 3 inclusive the numeral 2 denotes a flat ring-shaped side wall, and 5 denotes a flat ring-shaped tread piece of textile or other flexible or distensible material united thereto along one edge of each by lock-stitching 14 (see Fig. 9), where the margin of the part 5 is first shaped as a circular tube or housing 8 to receive the end parts of the split-ring 7 in an arcuate tube 6 of rigid material. The split-ring 7 is of resilient wire rod shaped as an expansion ring with ends spread apart normally widely as shown in said Fig. 6, where the tube 6 has an inpressed stop 12 to prevent the ring ends from escaping from said tube. In Figs. 8 and 11 the inner margin of the side wall 2 is shaped by lock stitching 16 into a tubular housing 4 for the paper seaming cord 3.

In Figs. 2, 3 and 10, the inner margin of the tread piece 5 is shaped into a housing ring 9 by lock stitching 15 to receive an elastic clamping cord 10, and this tread piece margin is shirred as shown.

The said side wall piece 2 and the tread piece 5 are preferably cut from like textile material on a bias of the warp and woof thereof, as indicated in Figs. 1 to 3 inclusive in an exaggerated view of the meshes of the material for the sake of clearness. In both said pieces when assembled, certain parts of the warp are positioned diametrically or approximately so across the face of the tire casing 1 or its tread, but in either case the other warp threads because of the bias cutting are directed at less than a right angle across the tire faces and its tread as clearly seen. However, the tread piece 5 has been so adjusted in position marginally relative to the side wall piece, that the right angle warps of one are presented to the other where the other has its presentation of less than a right angle thread. In each case where the warps are presented at less than a right angle to the diameter of the tire, the material of the textile is capable of being stretched radially relative to the tire, so that as the two pieces 2 and 5 are thus conjoined, there is an equalization of stretching of the cover all around the tire radially outwardly in a compensatory manner.

Automobile tires (casings) vary slightly, approximately three quarters of an inch, in diameters, so that it is necessary for the cover parts 2 and 5 to distend enough when stretched outwardly therearound to closely fit the tire adjustingly. This bias cutting and relative positioning of the pieces 2 and 5 allows this equalization as stated.

As the split-ring 7 is resilient and of the expansion type and tends to distend outwardly when in its textile tube housing 8, it keeps the side wall 2 stretched flat and smooth, the piece 5 also stretching in cooperation, so that the tire remains evenly smoothly covered throughout.

The elastic clamping ring 10 tends to draw inwardly the inner circular margin and housing tube 9 to secure the cover upon the tire evenly at that face thereof, but the rubber ring 10 (which may be a helical endless spring) may yield enough to compensate for any adjusting stretching of the cover parts 2 and 5 radially outwardly in distending these parts to fit tires of differing diameters.

This application for patent for tire cover is a continuation in part of my previous application for patent for tire cover, Serial Number 572,334, filed October 31, 1931.

Having described my invention, what I claim as new, and desire to secure by Letters Patent, is:

1. A flexible cover for a pneumatic tire for covering the tread thereof with marginal parts over the sides thereof, one marginal part including an elastic ring mounted around the edge thereof, said cover including an annular flexible tubular part between its tread part and the side marginal part opposite the other side marginal part which carries said elastic ring, a resilient split-ring loosely mounted within said tubular part and having spaced terminations, and a curvate rigid tube mounted in said tubular part to receive said terminations loosely to permit free expansion or contraction of the split-ring in fitting said cover upon tires of differing diameters.

2. A flexible cover for a pneumatic tire for covering the tread thereof with marginal parts over the sides thereof, one marginal part including an elastic ring mounted around the edge thereof, said cover including an annular flexible tubular part between its tread part and the side marginal part opposite the other side marginal part which carries said elastic ring, a resilient split-ring loosely mounted within said tubular part and having spaced terminations, a curvate rigid tube mounted loosely in said tubular part to loosely receive said terminations to permit free expansion or contraction of the split-ring in fitting said cover upon tires of differing diameters, and said curvate tube having a stop therein between said split-ring terminations.

BEN WENGARD.